G. W. TUCKER.

DRAWER PULL.

No. 10,201. Reissued Sept. 19, 1882.

Attest:
F. M. Burnham
William Paxton

G. W. Tucker
Inventor:
By his attorney
Charles E. Foster

H. PETERS, Photo-Lithographer, Washington, D. C.

UNITED STATES PATENT OFFICE.

GEORGE W. TUCKER, OF WATERBURY, CONNECTICUT.

DRAWER-PULL.

SPECIFICATION forming part of Reissued Letters Patent No. 10,201, dated September 19, 1882.

Original No. 234,696, dated November 23, 1880. Application for reissue filed May 3, 1882.

*To all whom it may concern:*

Be it known that I, GEORGE W. TUCKER, a citizen of the United States, and a resident of Waterbury, in the county of New Haven and State of Connecticut, have invented certain new and useful Improvements in Drawer-Pulls; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

The purpose of my invention is to avoid the expense and other objections incident to the ordinary modes of connecting drops or handles to the bolts in pulls for drawers, &c., and this I effect by dispensing with the ordinary spindles traversing the drops and substituting therefor a thimble firmly connected to each drop, as fully described hereinafter. I further effect this object by the use of a malleable-metal yoke, a bolt passing through the same and through the shell and drawer, and having a head bearing against and concealed by the yoke, and clamping the latter to the shell and the shell to the drawer.

Figure 1:
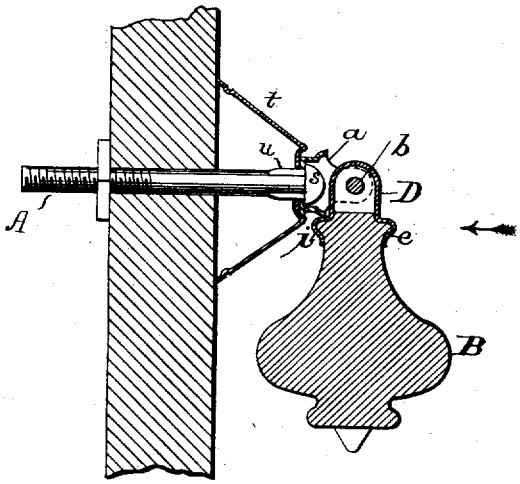
Figure 2:
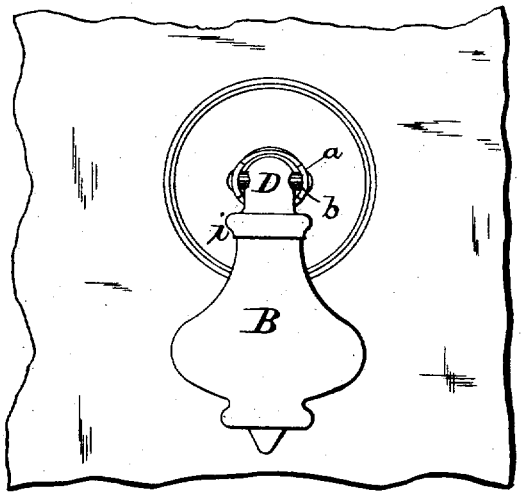

In the drawings, Figure 1 is a sectional view illustrating the construction of my improved pull; and Fig. 2, a side view, looking in the direction of the arrow, Fig. 1.

A is the bolt by which the drop is connected to the drawer or other object, and B the drop or handle, which may be connected in any suitable manner to the bolt, the latter being shown with a forked head, *a*, and transverse pin *b*, passing through the end of the handle.

The forked head *a* consists of a yoke of malleable metal with a hole at the back for the passage of the bolt, the head *s* of which bears against the back of the yoke and is surrounded and concealed by the yoke, as shown. The yoke is clamped by the head of the bolt against the usual conical shell, *t*, and an angular form is imparted by feathers or ribs *u* to the bolt where it passes through the yoke, so that the latter is prevented from turning on the bolt. This securing device is very cheap, as it enables me to dispense with the ordinary casting and expensive finishing. It is also as effective as the more expensive construction heretofore adopted.

Ordinarily a bolt or spindle passing through the handle is connected to the pin *b*, and provided at the lower end with a nut, the loss of which results in the detachment of the handle. When the handle is driven upon the spindle it is liable to be split or otherwise injured.

I provide the end of the handle with a cap, D, of metal, formed to fit the handle, and make the latter with an annular rib or shoulder, *e*, beneath which I bend or turn the edge of the thimble, so as to lock the latter firmly to the handle. The pin *b* passes through a hole transversely through both thimble and handle, and secures the latter flexibly to the bolt A. The cap D is of such strength that the pin *b* cannot tear the same, while the lips *i* will resist any power tending to remove the cap from the handle. The cap has the further effect of preventing the splitting of the handle by moisture or otherwise.

While the above construction obviates the objections to ordinary modes of attachment, it is stronger and cheaper.

I am aware that it is not new to confine metal tips to cords by indenting the tip, and do not claim, broadly, this mode of attachment; but I claim—

1. The wooden handle of a drawer-pull, provided with a thimble covering the inner end, having a lip engaging with a shoulder of the handle, said thimble constructed for jointing to the spindle by a transverse pin extending through the thimble, and serving both as a ferrule and as a means of connection, as set forth.

2. The combination, in a drawer-pull, of a headed bolt, A, passing through the drawer and through the shell *t*, forked head *a*, consisting of a yoke of malleable metal concealing the head *s* of the bolt and clamped thereby to the shell, and the drop-handle, substantially as set forth.

In testimony whereof I affix my signature in presence of two witnesses.

G. W. TUCKER.

Witnesses:

CHARLES E. FOSTER,

A. E. T. HANSMANN.